(12) United States Patent
Shibahara et al.

(10) Patent No.: US 12,468,804 B2
(45) Date of Patent: Nov. 11, 2025

(54) DATA CLASSIFICATION DEVICE, DATA CLASSIFICATION METHOD, AND DATA CLASSIFICATION PROGRAM

(71) Applicant: NIPPON TELEGRAPH AND TELEPHONE CORPORATION, Tokyo (JP)

(72) Inventors: Toshiki Shibahara, Musashino (JP); Daiki Chiba, Musashino (JP); Mitsuaki Akiyama, Musashino (JP); Kunio Hato, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1254 days.

(21) Appl. No.: 17/283,254

(22) PCT Filed: Oct. 7, 2019

(86) PCT No.: PCT/JP2019/039447
§ 371 (c)(1),
(2) Date: Apr. 7, 2021

(87) PCT Pub. No.: WO2020/075662
PCT Pub. Date: Apr. 16, 2020

(65) Prior Publication Data
US 2021/0342651 A1 Nov. 4, 2021

(30) Foreign Application Priority Data
Oct. 9, 2018 (JP) .................................. 2018-191174

(51) Int. Cl.
*G06N 20/00* (2019.01)
*G06F 18/10* (2023.01)
(Continued)

(52) U.S. Cl.
CPC .............. *G06F 21/56* (2013.01); *G06F 18/10* (2023.01); *G06F 18/241* (2023.01); *G06F 18/2431* (2023.01); *G06N 20/00* (2019.01)

(58) Field of Classification Search
CPC .... G06F 18/10; G06F 18/241; G06F 18/2431; G06F 21/56; G06N 20/00
See application file for complete search history.

(56) References Cited

U.S. PATENT DOCUMENTS 8,078,625 B1 12/2011 Zhang et al.
2012/0158626 A1 6/2012 Zhu et al.
(Continued)

FOREIGN PATENT DOCUMENTS

CN 107534675 A * 1/2018 ............. G06F 3/048
CN 103927486 B * 3/2018 ............. G06F 21/561
(Continued)

OTHER PUBLICATIONS

Shun Tobiyama, etc., "Malware Detection with Deep Neural Network Using Process Behavior", published via 2016 IEEE 40th Annual Computer Software and Applications Conference, retrieved Aug. 9, 2024. (Year: 2016).*

(Continued)

*Primary Examiner* — Shourjo Dasgupta
(74) *Attorney, Agent, or Firm* — XSENSUS LLP

(57) ABSTRACT

A data classification device includes: a known data input unit that receives an input of known data, the known data being data already classified into a class and a subclass subordinate to the class; a feature extraction unit that extracts, from features included in the known data, a feature that causes classification of the known data belonging to the same class into a subclass using the feature to fail; and a
(Continued)

classification unit that classifies classification target data into a class using the feature extracted by the feature extraction unit.

7 Claims, 11 Drawing Sheets

(51) Int. Cl.
   *G06F 18/241* (2023.01)
   *G06F 18/2431* (2023.01)
   *G06F 21/56* (2013.01)

(56) References Cited

U.S. PATENT DOCUMENTS

| | | | | |
|---|---|---|---|---|
| 2012/0254333 | A1* | 10/2012 | Chandramouli | G06F 40/10 709/206 |
| 2015/0156211 | A1* | 6/2015 | Chi Tin | H04L 63/1408 726/23 |
| 2017/0244741 | A1* | 8/2017 | Ferrer | G06F 21/552 |
| 2018/0007003 | A1 | 1/2018 | Hodgman et al. | |

FOREIGN PATENT DOCUMENTS

| | | | | |
|---|---|---|---|---|
| JP | 2004537916 | A | * 12/2004 | H04L 43/062 |
| JP | 2017142552 | A | * 8/2017 | |
| JP | 2018517999 | A | * 7/2018 | H04L 63/14 |

OTHER PUBLICATIONS

TaeGuen Kim, etc., "A Multimodal Deep Learning Method for Android Malware Detection using Various Features", published in IEEE Transactions on Information Forensics and Security, 14(3), 773-788 (print publication Aug. 21, 2018), retrieved Aug. 9, 24. (Year: 2018).*

Rajesh Kumar, etc., "Malware Detection Modeling Systems", published via 2018 International Conference on Recent Trends in Advance Computing, pp. 187-192 (publication date Sep. 1, 2018), retrieved Aug. 9, 2024. (Year: 2018).*

Hye Min Kim, etc., "Andro-Simnet: Android Malware Family Classification using Social Network Analysis", published via 2018 16th Annual Conference on Privacy, Security and Trust, pp. 1-8 (publication date Aug. 1, 2018), retrieved Aug. 9, 2024. (Year: 2018).*

Zhang Fuyong, etc., "Malware Detection and Classification Based on n-grams Attribute Similarity", published via 2017 IEEE International Conference on Computational Science and Engineering (CSE) and IEEE International Conference on Embedded and Ubiquitous Computing (EUC), retrieved Aug. 9, 2024. (Year: 2017).*

Mohammad Imran, etc., "Similarity-based Malware Classification using Hidden Markov Model", published via 2015 Fourth International Conference on Cyber Security, Cyber Warfare, and Digital Forensic, pp. 129-134, retrieved Aug. 9, 2024. (Year: 2015).*

Zhihua Cui, etc., "Detection of Malicious Code Variants Based on Deep Learning", published via IEEE Transactions On Industrial Informatics, vol. 14, No. 7, p. 3187, Jul. 2018, retrieved Aug. 9, 2024. (Year: 2018).*

Edmar Rezende, etc., "Malicious Software Classification using Transfer Learning of ResNet-50 Deep Neural Network", published via 2017 16th IEEE International Conference on Machine Learning and Applications, retrieved Aug. 9, 2024. (Year: 2017).*

William Fleshman, etc., "Static Malware Detection & Subterfuge: Quantifying the Robustness of Machine Learning and Current Anti-Virus", published via 2018 13th International Conference on Malicious and Unwanted Software, publication date Oct. 1, 2018, retrieved Aug. 9, 24. (Year: 2018).*

Chang-Bin Zhang, etc., "Delving Deep into Label Smoothing", published via Journal of Latex Class Files, vol. 14, No. 8, Aug. 2015, retrieved Aug. 9, 2024. (Year: 2015).*

"1.16 Probability calibration", published on Aug. 27, 2016 to https://scikit-learn.org/stable/modules/calibration.html, retrieved Aug. 9, 2024. ( Year: 2016).*

Dario Garcia-Gasulla, etc., "On the Behavior of Convolutional Nets for Feature Extraction", published on Jan. 29, 2018 to arXiv, retrieved Feb. 22, 2025. (Year: 2018).*

CS231n Convolutional Neural Networks for Visual Recognition, published on Feb. 10, 2015 to https://cs231n.github.io/transfer-learning, retrieved Feb. 22, 2025. (Year: 2015).*

Lars Hulstaert, "Transfer Learning: Leverage Insights from Big Data", published on Jan. 19, 2018 to https://www.datacamp.com/tutorial/transfer-learning, retrieved Feb. 22, 2025. (Year: 2018).*

Kateryna Chumachenko, "Machine Learning Methods for Malware Detection and Classification", published in 2017 to https://core.ac.uk/download/pdf/80994982.pdf, retrieved Feb. 22, 2025. (Year: 2017).*

Yong Jin, etc., "A Client Based Anomaly Traffic Detection and Blocking Mechanism by Monitoring DNS Name Resolution with User Alerting Feature", published via 2018 International Conference on Cyberworlds (CW) (2018, pp. 351-356), Oct. 3-Oct. 5, 2018, retrieved Jun. 16, 2025. (Year: 2018).*

Google Workspace Admin Help, "Advanced phishing and malware protection", published Mar. 21, 18 to https://support.google.com/a/answer/9157861?hl=en, retrieved Jun. 16, 2025. (Year: 2018).*

"Malware Incident Response Steps on Windows, and Determining if the Threat Is Truly Gone", published Mar. 21, 2017 to https://www.rapid7.com/blog/post/2017/03/21/responding-to-malware-events-on-windows-determining-if-the-threat-is-truly-gone, retrieved Jun. 16, 25. (Year: 2017).*

Yahoo Help, "Suspicious activity alert received when an email is sent", published on May 22, 2015 to http://help.yahoo.com/kb/SLN3406.html, retrieved Jun. 16, 25. (Year: 2015).*

Arp et al., "DREBIN: Effective and Explainable Detection of Android Malware in Your Pocket", Proceedings of the 2014 Network and Distributed System Security Symposium, Feb. 2014, pp. 1-15.

Xu et al., "Neural Network-based Graph Embedding for Cross-Platform Binary Code Similarity Detection", Proceedings of the 24th ACM Conference on Computer and Communications Security, Oct. 2017, pp. 363-376.

Bartos et al., "Optimized Invariant Representation of Network Traffic for Detecting Unseen Malware Variants", Proceedings of the 25th USENIX Security Symposium, Aug. 10-12, 2016, pp. 807-822.

Jordaney et al., "Transcend: Detecting Concept Drift in Malware Classification Models", Proceedings of the 26th USENIX Security Symposium, Aug. 16-18, 2017, pp. 625-642.

Bousmalis et al., "Domain Separation Networks", Proceedings of the 29th Advances in Neural Information Processing Systems, Dec. 2016, pp. 343-351.

* cited by examiner

| SERIAL NUMBER | NUMERICAL VECTOR |
|---|---|
| 1 | [0.2, 1.4, 1.2, 0.9] |
| 2 | [0.2, 1.1, 1.6, 1.1] |
| 3 | [0.2, 1.2, 1.4, 1.0] |

| SERIAL NUMBER | NUMERICAL VECTOR | CLASS | SUBCLASS |
|---|---|---|---|
| 1 | [0.2, 0.5, 1.6, 2.1] | MALICIOUS | Rig |
| 2 | [0.2, 0.1, 1.5, 1.6] | MALICIOUS | Neutrino |
| 3 | [0.9, 1.1, 0.5, 0.9] | BENIGN | |

FIG.5

FIG.10
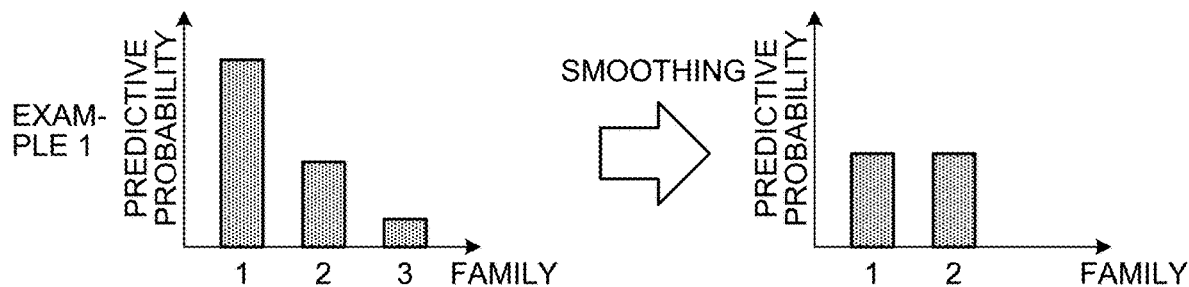
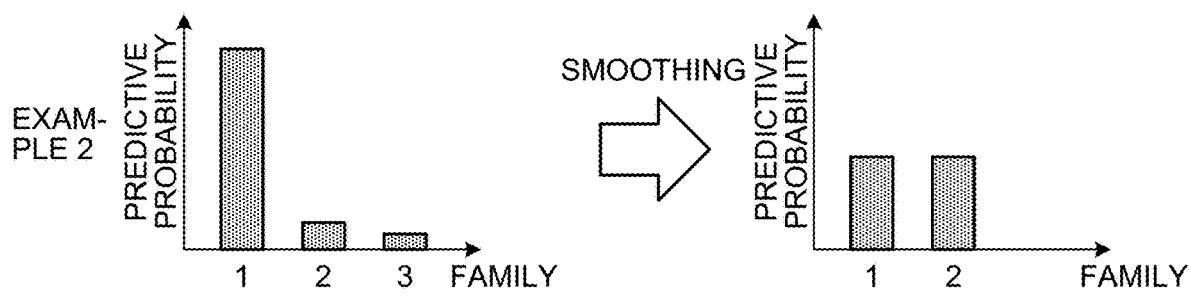
FIG.11
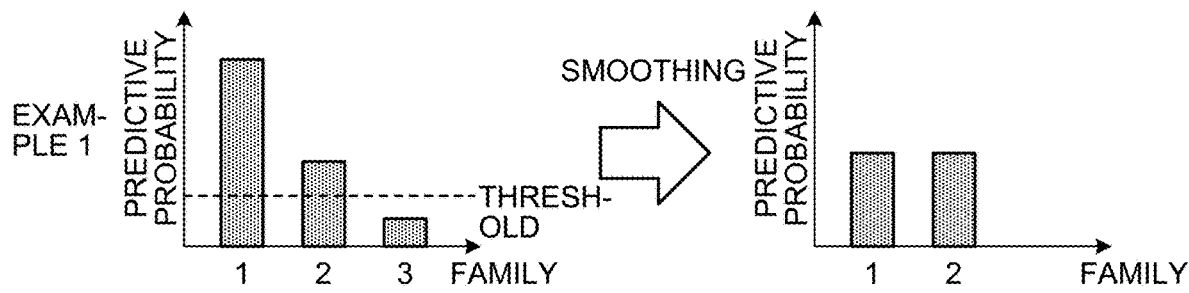
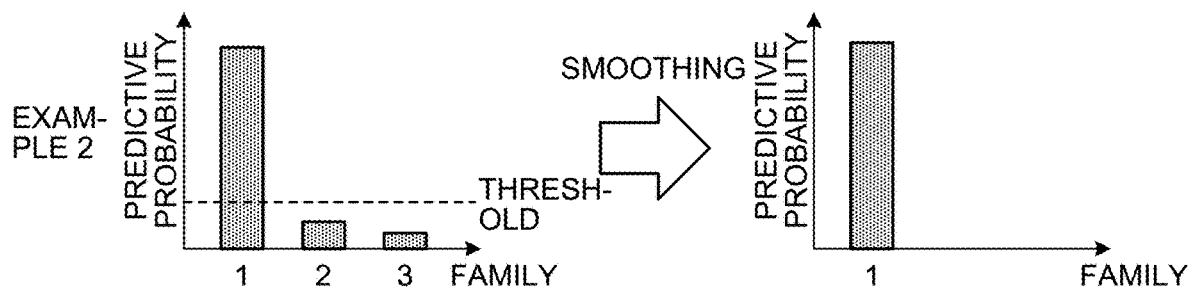

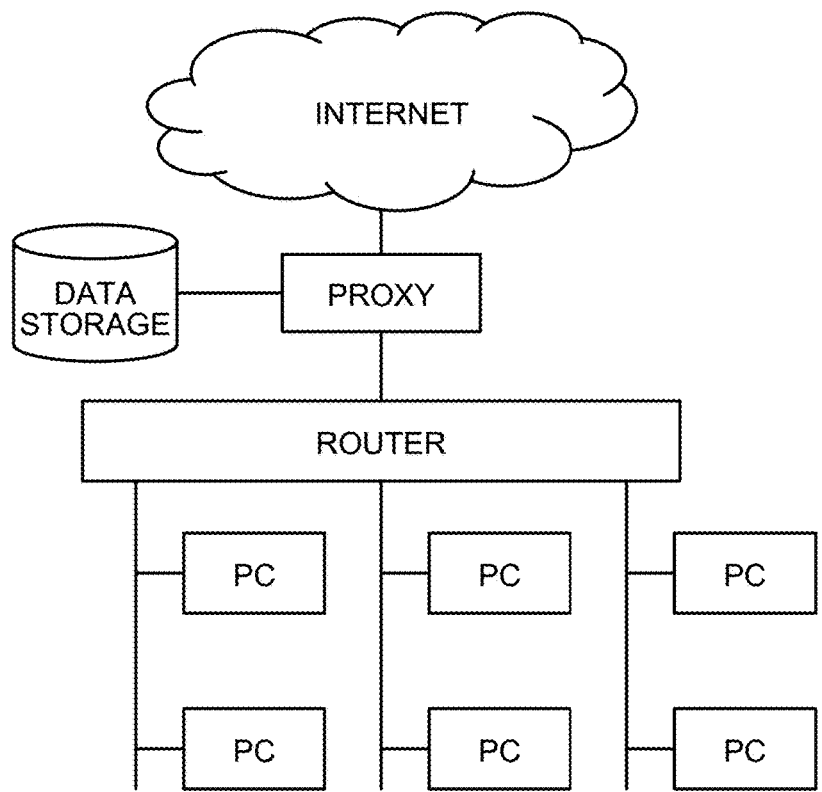

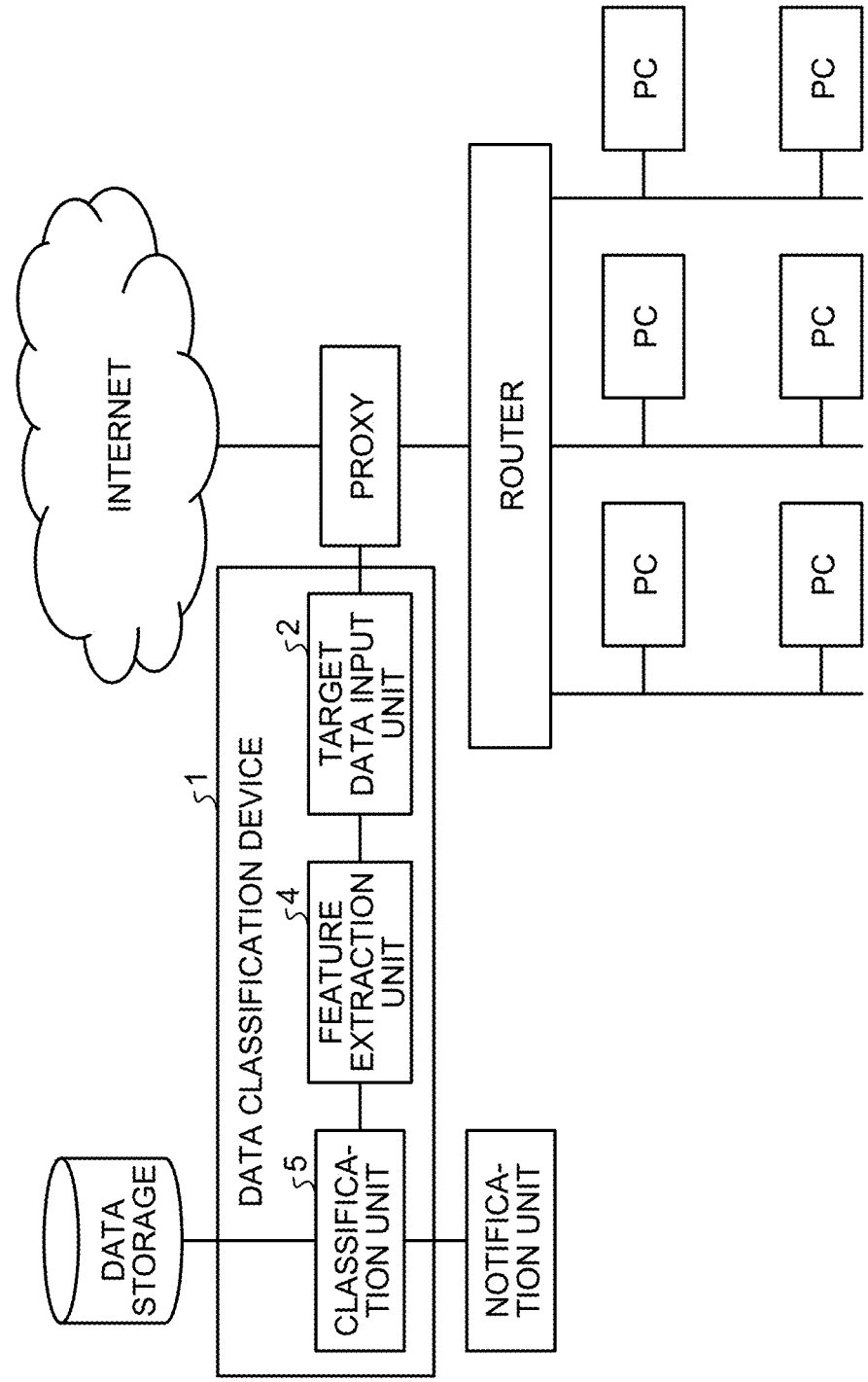

DATA CLASSIFICATION DEVICE, DATA CLASSIFICATION METHOD, AND DATA CLASSIFICATION PROGRAM

CROSS-REFERENCE TO RELATED APPLICATIONS

The present application is based on PCT filing PCT/JP2019/039447, filed Oct. 7, 2019, which claims priority to JP 2018-191174, filed Oct. 9, 2018, the entire contents of each are incorporated herein by reference.

FIELD

The present invention relates to a data classification device, a data classification method, and a data classification program.

BACKGROUND

Data classification using machine learning is broadly employed in various fields. For example, in the field of cyber security, the technology is used for classification of Android (registered trademark) applications (see Non Patent Literature 1), classification of firmware of IoT devices (see Non Patent Literature 2), and other purposes. The technology of classification allows for identifying applications similar to known malicious applications and computer programs similar to known vulnerable programs.

Machine learning is usually based on the assumption that known data and classification target data share features. Features of data, however, may sometimes change over time. To accurately classify data against changes in features over time, various methods have been developed, such as designing feature data invariant to changes over time (see Non Patent Literature 3) and detecting aging of feature data (see Non Patent Literature 4).

Usual machine learning needs a large amount of labeled known data; however, such labeled data is sometimes difficult to be obtained. For machine learning without the necessity of labeled data, such a method has been developed that uses data that is easy to be labeled and is similar to classification target data (see Non Patent Literature 5).

This method uses labeled data (source) similar to classification target data and unlabeled classification target data (target).

More specifically, this method extracts features shared by the source and the target and adjusts the manner of extracting features such that classification of the source and the target using the extracted features fails. For example, if the source is photographed data and the target is sketched data, the contour of an object is extracted as a feature shared by the source and the target. The manner of extracting features is adjusted such that classification of the source and the target using the extracted feature fails. With this adjustment, the method extracts features shared by the source and the target (for example, the contour of an object) while extracting no features that are specific to the source, for example, specific color and texture. Machine learning able to classify the source using the adjusted features allows for accurate classification of the target.

CITATION LIST

Non Patent Literature

Non Patent Literature 1: D. Arp, M. Spreitzenbarth, et al., "DREBIN: Effective and Explainable Detection of Android Malware in Your Pocket", Proceedings of the 2014 Network and Distributed System Security Symposium, 2014.

Non Patent Literature 2: X. Xu et al., "Neural Network-based Graph Embedding for Cross-Platform Binary Code Similarity Detection", Proceedings of the 24th ACM Conference on Computer and Communications Security, pp. 363-376, 2017.

Non Patent Literature 3: K. Bartos, et al., "Optimized Invariant Representation of Network Traffic for Detecting Unseen Malware Variants", Proceedings of the 25th USENIX Security Symposium, pp. 807-822, 2016.

Non Patent Literature 4: R. Jordaney, et al., "Transcend: Detecting Concept Drift in Malware Classification Models", Proceedings of the 26th USENIX Security Symposium, pp. 625-642, 2017.

Non Patent Literature 5: K. Bousmalis, et al., "Domain Separation Networks", Proceedings of the 29th Advances in Neural Information Processing Systems, pp. 343-351, 2016.

SUMMARY

Technical Problem

In the field of cyber security, groups (hereinafter, referred to as families) of malicious data created with the same tool are similar to one another. The above machine learning is able to accurately classify new data if the family of the new data includes known data. However, if the family of the new data includes no known data (if it is an unknown family), accurate classification is difficult.

For example, the above method is effective in accurately classifying data the features of which gradually change; however, the method is not adoptable for unknown families, the features of which are subject to drastic changes. Another method, which uses similar labeled data for classification when labeled data is not available, is also not adoptable because unlabeled data of an unknown family is not available in advance. As described above, accurate classification of data of an unknown family has been difficult with conventional approaches. Motivated by this, the present invention aims to accurately classify data of an unknown family.

Solution to Problem

In order to solve the above problem, the present invention includes a data classification device, comprising: a known data input unit that receives an input of known data, the known data being data already classified into a class and a subclass subordinate to the class; a feature extraction unit that extracts, from features included in the known data, a feature that causes classification of the known data belonging to a same class into a subclass using the feature to fail; and a classification unit that classifies classification target data into a class using the feature extracted by the feature extraction unit.

Advantageous Effects of Invention

According to the present invention, data of an unknown family can be accurately classified.

BRIEF DESCRIPTION OF DRAWINGS

FIG. 5 is a drawing to explain example classification of target data performed by a classification unit of FIG. 1.

FIG. 10 is a diagram to explain a method to increase the predictive probabilities of a predetermined number of subclasses (families) selected in the descending order from the subclass with the highest probability.

FIG. 11 is a diagram to explain a method to increase the predictive probabilities of a predetermined number of subclasses (families) the predictive probabilities of which are greater than a predetermined threshold.

FIG. 14 is a diagram that illustrates an example system including a data storage to record proxy logs.

FIG. 15 is a diagram that illustrates example calculation of numerical vectors.

FIG. 16 is a diagram that illustrates an example system including the data classification device.

DESCRIPTION OF EMBODIMENTS

Embodiments of the present invention will now be described from a first embodiment to a third embodiment with reference to the drawings. The present invention is not limited to the embodiments.

First Embodiment

Configuration

Figures 1, 2:
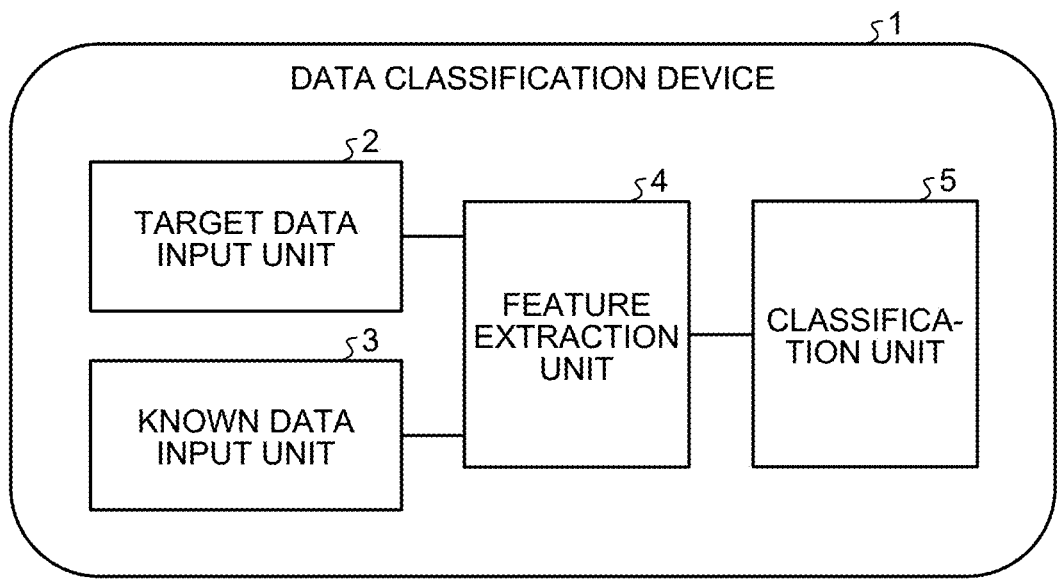
FIG. 1 is an example configuration of a data classification device.
FIG. 2 is a diagram that illustrates example target data.

An example configuration of a data classification device 1 of a first embodiment will now be described with reference to FIG. 1. In the following description, the class of data means an attribute of the data, for example, whether the data is malicious or benign. The subclass is a detailed attribute of the class (a subordinate attribute of the class). In other words, the subclass is a label of a family or the like formed by dividing the class of malicious, benign, or the like into a plurality of groups.

The data classification device 1 classifies new data (data of an unknown family) into a class. The data classification device 1 includes a target data input unit (new data input unit) 2, a known data input unit 3, a feature extraction unit 4, and a classification unit 5.

The target data input unit 2 receives an input of target data (new data) to be classified. Target data includes, for example, a serial number and a numerical vector (see FIG. 2). The numerical vector is a vector that represents the characteristics of data in a predetermined fashion. Each of the target data pieces illustrated in FIG. 2 is an example representation of data characteristics using a numerical vector having four feature values. The feature values of a numerical vector are, for example, the presence or absence of a subdomain, the number of levels in the path hierarchy, and the number of queries, in a malicious uniform resource locator (URL).

The known data input unit 3 receives an input of known data (data already classified into classes and subclasses). The known data includes, for example, a serial number, a numerical vector, a class, and a subclass (see FIG. 3). The numerical vector is created in the same fashion as that to create the numerical vector of target data. For example, if the numerical vector of target data has three feature values, that are, the presence or absence of a subdomain, the number of levels in the path hierarchy, and the number of queries, the numerical vector of known data similarly has three feature values, the presence or absence of a subdomain, the number of levels in the path hierarchy, and the number of queries.

The class of known data may be, for example, "benign" and "malicious", or may be "drive-by download", "targeted attack", "phishing", and others. A subclass as a further detailed category of the class may be assigned to every data piece, or to some of data pieces. For example, a subclass of a "malicious" class may be termed "Rig", "Neutrino", "Magnitude", and the like that are the names of exploit kits for creating malicious sites. Other than these, the subclass may be given names of malware families such as "ransomware", "downloader", and "PUP". In this manner, for example, data groups belonging to the same subclass are malicious data groups created by the same malicious tool (such as the above "Rig").

The feature extraction unit 4 extracts such features (features shared between the subclasses in the same class) that cause classification of known data of the same class into subclasses using the features to fail, from features included in the known data. For example, if the numerical vector of the known data is composed of N-dimensional variables, the feature extraction unit 4 extracts variables (for example, the first and the third dimensional values of the numerical vector) the values (feature values) of which are close between the subclasses, of the N-dimensional variables.

The feature extraction unit 4 extracts features from known data, and evaluates how accurately known data of the same class can be classified into subclasses using the extracted features. Based on the evaluation, if the feature extraction unit 4 determines that the extracted features enable accurate classification of known data of the same class into subclasses (determines that classification succeeds), the feature extraction unit 4 changes features to be extracted. If the feature extraction unit 4 determines that the extracted features do not enable accurate classification of known data of the same class into subclasses (determines that classification fails), the feature extraction unit 4 outputs the features to the classification unit 5.

The general operation of the above feature extraction unit 4 will now be described with reference to FIG. 4. A rectangular box of FIG. 4 indicates a numerical vector, and the circles in the box indicate variables of the numerical vector.

Figures 3, 4:
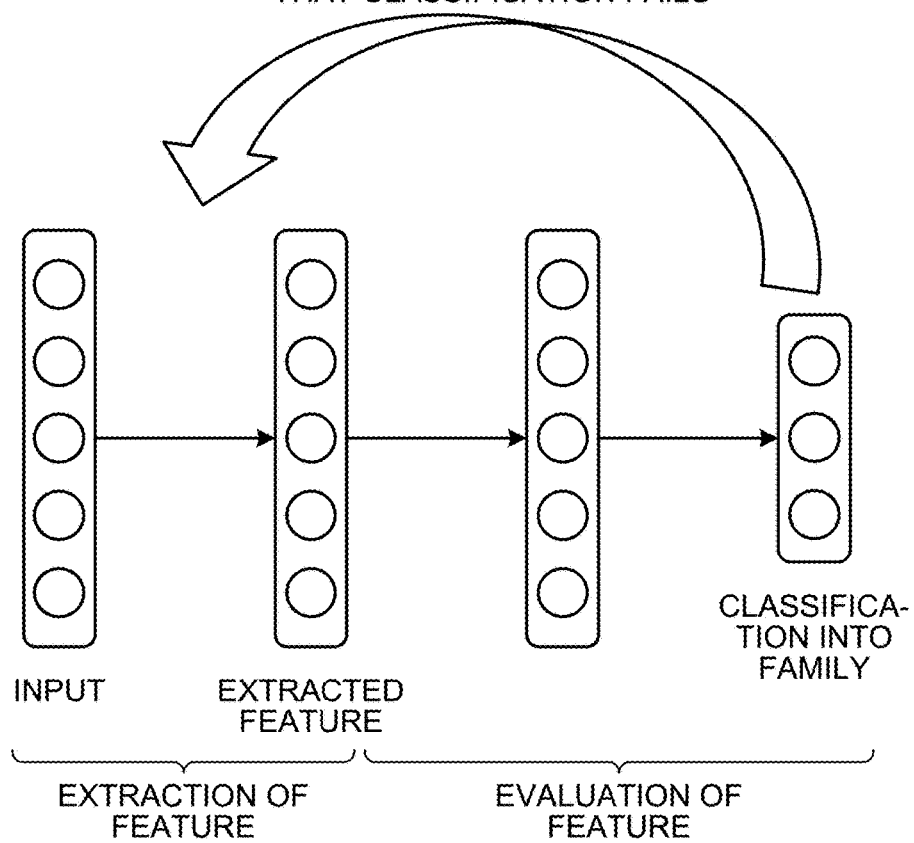
FIG. 3 is a diagram that illustrates example known data.
FIG. 4 is a drawing to explain general operation of a feature extraction unit of FIG. 1.

For example, in FIG. 4, each circle contained in the rectangle box of "input" indicates a variable of a numerical vector of input data (for example, known data). Each circle in the box of "extracted feature" indicates a feature extracted from the variable of the numerical vector of the input data.

Arrows of FIG. 4 indicate selection of a part of the numerical vector and conversion of the vector using neural networks, support vector machines (SVMs), random forests, and other methods. The left side of FIG. 4 corresponds to feature extraction performed by the feature extraction unit 4, and the right side corresponds to feature evaluation by the feature extraction unit 4 (this will be similarly applied to FIG. 8 and FIG. 9).

For example, as illustrated in FIG. 4, the feature extraction unit 4 extracts features from variables of a numerical vector of input data and evaluates how accurate the classification into families (subclasses) can be using the features. If the evaluation result indicates that classification into the families has succeeded with the features, the feature extraction unit 4 changes features to be extracted. If the evaluation result indicates that classification into the families has failed with the features, the feature extraction unit 4 outputs the features to the classification unit 5. The feature extraction unit 4 changes features to be extracted from the input data, so that classification of the input data into the families fails with the features.

In extraction of features from the numerical vector of input data, the feature extraction unit 4 may select a part of the numerical vector or may convert the vector to a low-dimensional vector using, for example, neural networks. When evaluating how accurate the classification into the subclasses can be using the extracted features, the feature extraction unit 4 may use neural networks for the classification. Instead of this, random forests, SVMs, and other methods may be used.

Features to be extracted are changed (adjusted) in the following example manner. In extracting features from a part of the numerical vector illustrated in FIG. 3, the feature extraction unit 4 reselects features (for example, the first and the third dimensional values of the numerical vector) that cause classification into the subclasses to fail and creates a new numerical vector having the reselected features.

In extracting features by converting the numerical vector to a low-dimensional vector using a neural network, the feature extraction unit 4 changes the weight between the neurons of the neural network.

To cause classification into the subclasses to fail, for example, the feature extraction unit 4 may adjust the features so that the predictive probability, which is the likelihood that the data falls into a certain subclass, is consistent across the subclasses. The feature extraction unit 4 may adjust the features so that the predictive probability is decreased.

The classification unit 5 classifies target data (new data) into a class using the features extracted by the feature extraction unit 4. For example, as illustrated in FIG. 5, if the features extracted from known data by the feature extraction unit 4 are the first and the third dimensional values of the numerical vector and if the numerical vector of the target data is given as [0.2, 1.2, 1.4, 1.0], the classification unit 5 calculates the similarity using the numerical vectors (a reference numeral 1101) of the respective known data pieces and the first and the third dimensional values of the numeral vector of the target data. The similarity is calculated by the following example expression (1). The classification unit 5 classifies the target data into the data class (for example, "malicious") of the serial number 2 that has been determined to be most similar by the calculation.

$$\text{SIMILARITY} = \frac{1}{|x - y|^2} \quad \text{EXPRESSION (1)}$$

$x$: KNOWN DATA, $y$: TARGET DATA

The similarity described above is calculated using the inverse of the L2 norm for the difference of the vectors. Instead of this, the similarity may be calculated using the inner product of the vectors or the inverse of the L1 norm for the difference of the vectors.

For example, as illustrated in FIG. 5, if the similarity between the known data and the target data is calculated simply using the numerical vectors (the four dimensional values) of the known data and the target data, there is only a small difference in similarity between the data of the class "malicious" and the data of the class "benign" in the known data (such as "0.63" of the serial number 2 and "0.75" of the serial number 3). The classification unit 5 thus cannot classify the target data as "malicious".

The numerical vectors of different subclasses, however, have the first and the third dimensional values close to each other. Extracting the first and the third dimensional values as features therefore increases the difference in similarity between the data of the class "malicious" and the data of the class "benign" in the known data (such as "100" of the serial number 2 and "1.3" of the serial number 3). The classification unit 5 thus can classify the target data as "malicious".

As described above, the data classification device 1 extracts such features that are shared between the subclasses in the same class from known data, and uses the features to classify target data into a class. This method thus can increase the accuracy of classifying the target data into a class.

Processing Procedure

Figure 6:
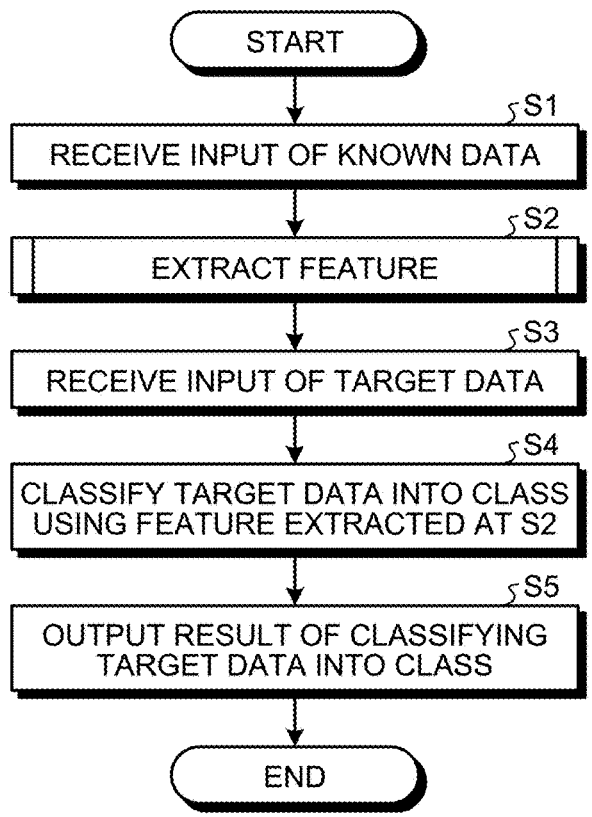
FIG. 6 is a flowchart that illustrates an example processing procedure performed by the data classification device of FIG. 1.

An example processing procedure performed by the data classification device 1 will now be described with reference to FIG. 6. The known data input unit 3 of the data classification device 1 receives an input of known data (S1). The feature extraction unit 4 extracts features from the known data received at S1 (S2). When the target data input unit 2 receives an input of target data (S3), the classification unit 5 classifies the target data into a class using the features extracted at S2 (S4). The classification unit 5 outputs the result of classification of the target data into the class (for example, malicious or benign) (S5).

Figure 7:
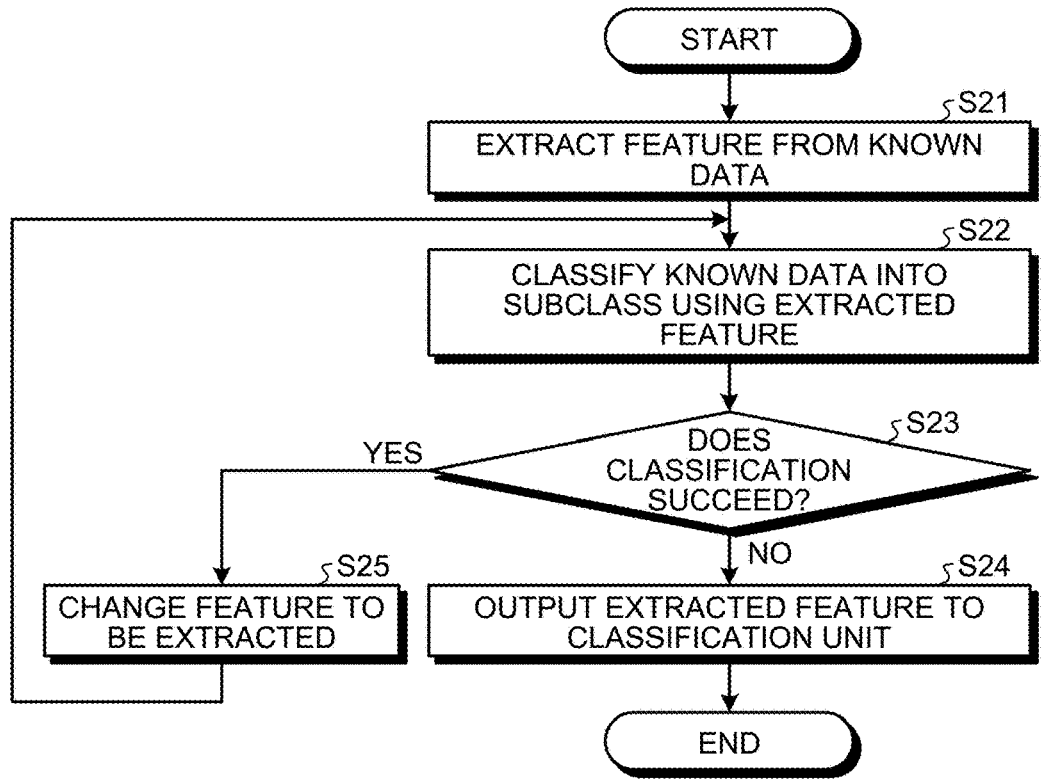
FIG. 7 is a flowchart that illustrates detailed feature extraction processing performed at S2 of FIG. 6.

The processing performed at S2 of FIG. 6 will now be described with reference to FIG. 7. The feature extraction unit 4 extracts features from the known data received at S2 (S21), and classifies the known data in the same class into subclasses using the extracted features (S22). If the feature extraction unit 4 determines that classification of the known data into subclasses has failed with the extracted features (No at S23), the feature extraction unit 4 outputs the extracted features to the classification unit 5 (S24). If the feature extraction unit 4 determines that classification of the known data into subclasses has succeeded with the extracted features (Yes at S24), the feature extraction unit 4 changes features to be extracted (S25) and returns the processing back to S22. The feature extraction unit 4 then performs the processing of S22 using features that are different from the features previously extracted from the known data.

As described above, the data classification device 1 extracts features shared by the subclasses in the same class (features that cause classification into subclasses in the same class to fail) from known data and classifies target data into a class based on the features. This method can improve the accuracy of classifying the target data into a class. The data classification device 1 is therefore allowed to extract features difficult to be changed by an attacker, from, for example, an application likely to be exploited for attack and a registrar not strictly managed, and uses the features for classification of target data. The data classification device 1 can therefore accurately classify target data as malicious or not malicious, even if the data is from an unknown family. The data classification device 1 thus can improve the rate of detection of malicious data of an unknown family.

Second Embodiment

The above feature extraction unit 4 may extract features from known data, considering that classification of known data into classes succeeds.

Figure 8:
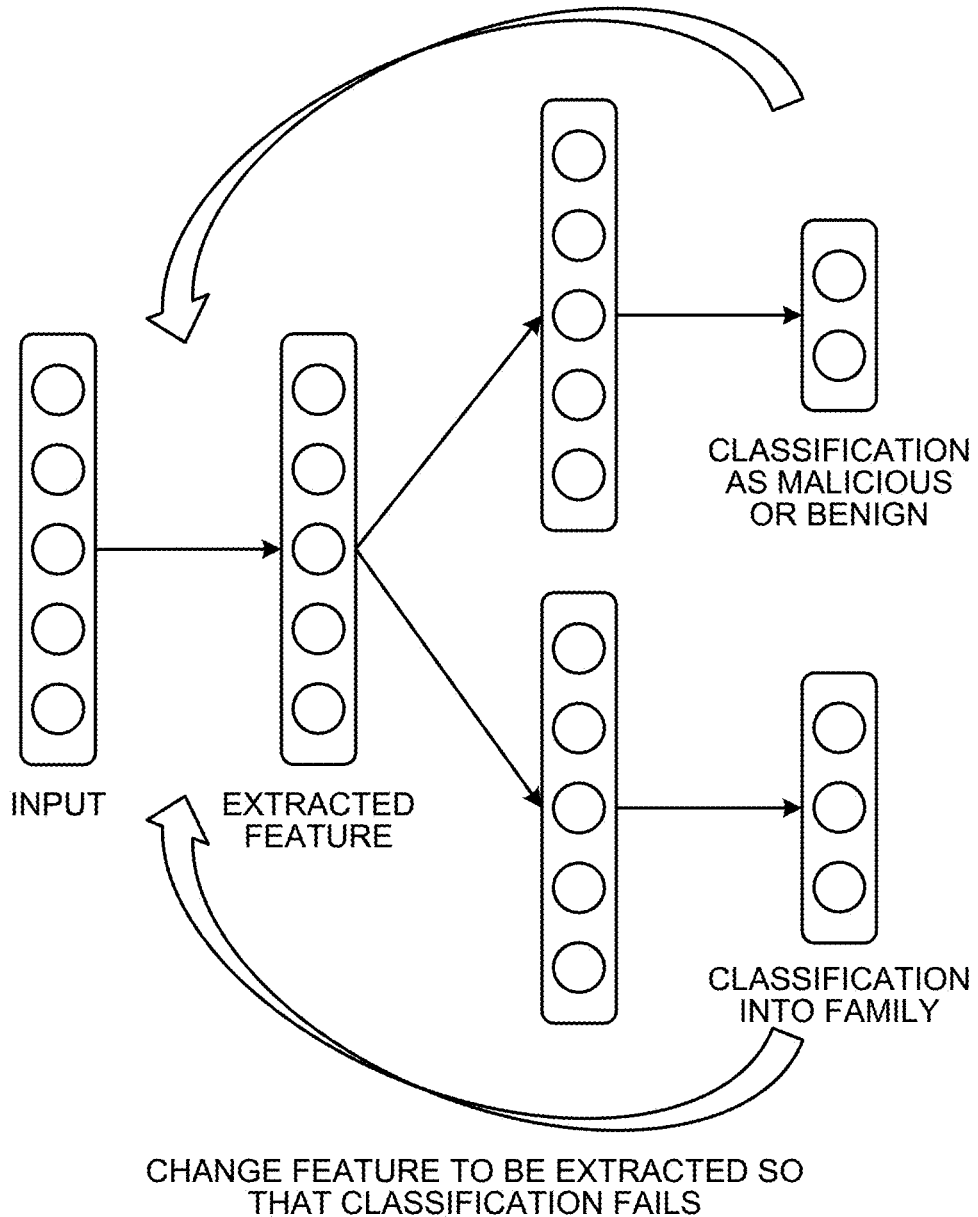
FIG. 8 is a drawing to explain general operation of the feature extraction unit of the data classification device in a second embodiment.

For example, as illustrated in FIG. 8, the feature extraction unit 4 of the data classification device 1 uses features extracted from known data to classify known data in the same class into the families (into the subclasses) and to classify the known data as malicious or benign (to classify into the classes). The feature extraction unit 4 changes features to be extracted so that classification of known data in the same class into the subclasses fails, whereas classification of the known data into the classes succeeds. This method allows the feature extraction unit 4 to extract features that enable more accurate classification into classes, from the known data.

Third Embodiment

The feature extraction unit 4 may extract such features, from known data, that cause classification of known data of the same class into subclasses that are similar to one another to fail.

In other words, if the feature extraction unit 4 is configured to extract such features that cause classification into any subclass in the same class to equally fail, features may be problematically extracted from a subclass having almost no shared features. If the classification unit 5 uses such features, the accuracy of classifying target data into a class may be impaired. The feature extraction unit 4 is therefore configured to extract such features that cause data classification into similar subclasses of the subclasses in the same class to fail. This technique is effective in stable extraction of features that cause classification into classes to succeed.

The similar subclasses may be manually set by an administrator or the like of the data classification device 1 or may be set according to the results of data classification into subclasses that has been previously performed using numerical vectors of known data.

For example, in the case of using the results of previously performed data classification and classifying known data in the same class into subclasses based on the extracted features, the feature extraction unit 4 calculates the predictive probabilities that predict into which subclasses the known data is classified.

Figure 9:
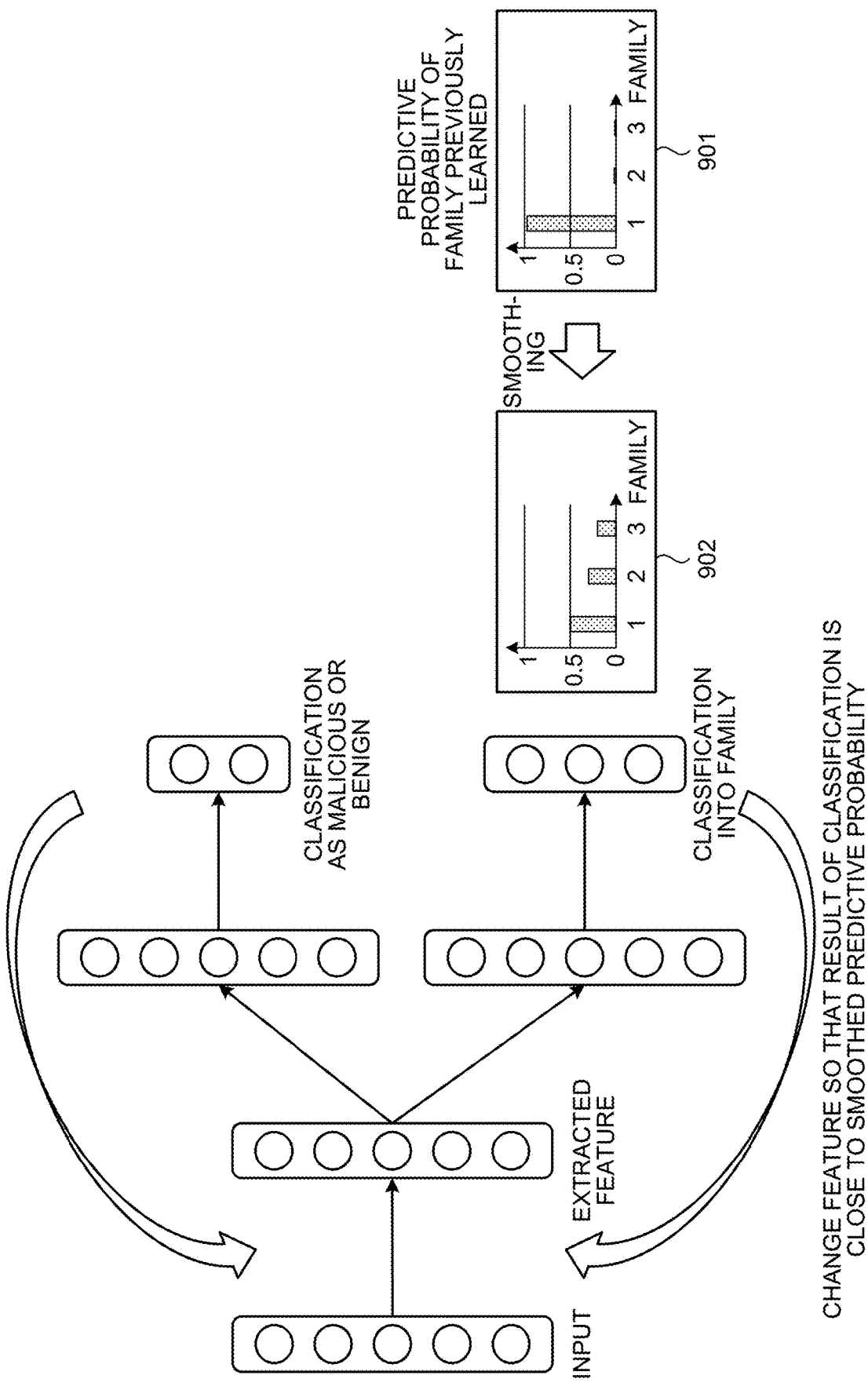
FIG. 9 is a drawing to explain general operation of the feature extraction unit of the data classification device in a third embodiment.

For example, as illustrated in a graph 901 of FIG. 9, the feature extraction unit 4 calculates the predictive probability, for each of the families (subclasses) 1, 2, and 3, that the data falls into the family (subclass). The feature extraction unit 4 smooths the predictive probability of each family, as indicated by a graph 902. The feature extraction unit 4 changes (adjusts) features so that results obtained by classifying known data into the families using the features are close to the respective predictive probabilities after smoothing.

For example, in the graph 901 of FIG. 9, it is not obvious which family is similar to the "family 1" having the highest predictive probability. When the feature extraction unit 4 smooths the predictive probabilities of the respective families as indicated by the graph 902, it becomes obvious that the "family 2" is similar to the family 1. In this manner, if it is difficult to tell beforehand which family is similar to which family, the similarity is easily estimated by referring to the predictive probabilities of the families calculated in advance by the feature extraction unit 4. The feature extraction unit 4 adjusts features to be extracted such that the results of classification into families become close to the smoothed predictive probabilities. This technique facilitates extraction of features shared between similar families.

The feature extraction unit 4 may adjust features so that the results of classification into families are close to the smoothed predictive probabilities and that classification into classes succeeds, as illustrated in FIG. 9, or the feature extraction unit 4 may adjust features only so that the results of classification into families are close to the smoothed predictive probabilities.

Example Method of Smoothing Predictive Probability

The feature extraction unit 4 smooths the predictive probabilities relating to classification into the subclasses by the following example methods. The predictive probability of the subclass may be smoothed by the following example four methods (1) to (4).

(1) Increasing the predictive probabilities of a certain number of subclasses (families) selected in descending order from the subclass having the highest probability (see FIG. 10).

(2) Increasing the predictive probabilities of subclasses (families) the values of which are greater than a predetermined threshold (see FIG. 11).

Figure 12:
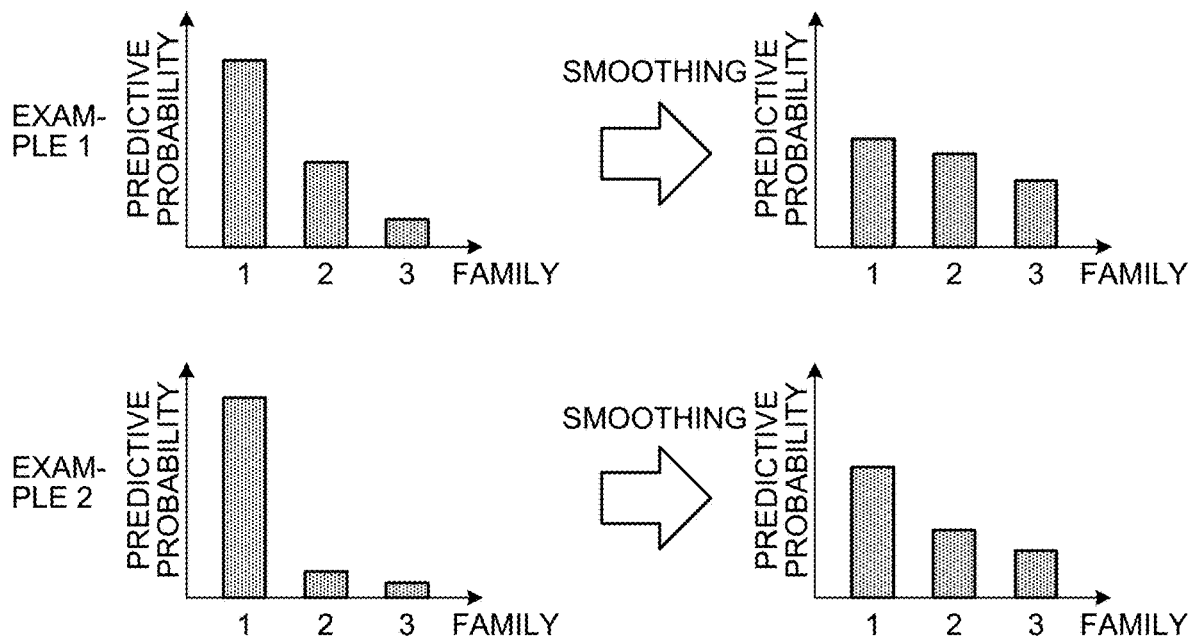
FIG. 12 is a diagram to explain a method to add a predetermined value (constant) to the predictive probability.

(3) Adding a certain value (constant) to the predictive probabilities (see FIG. 12).

Figure 13:
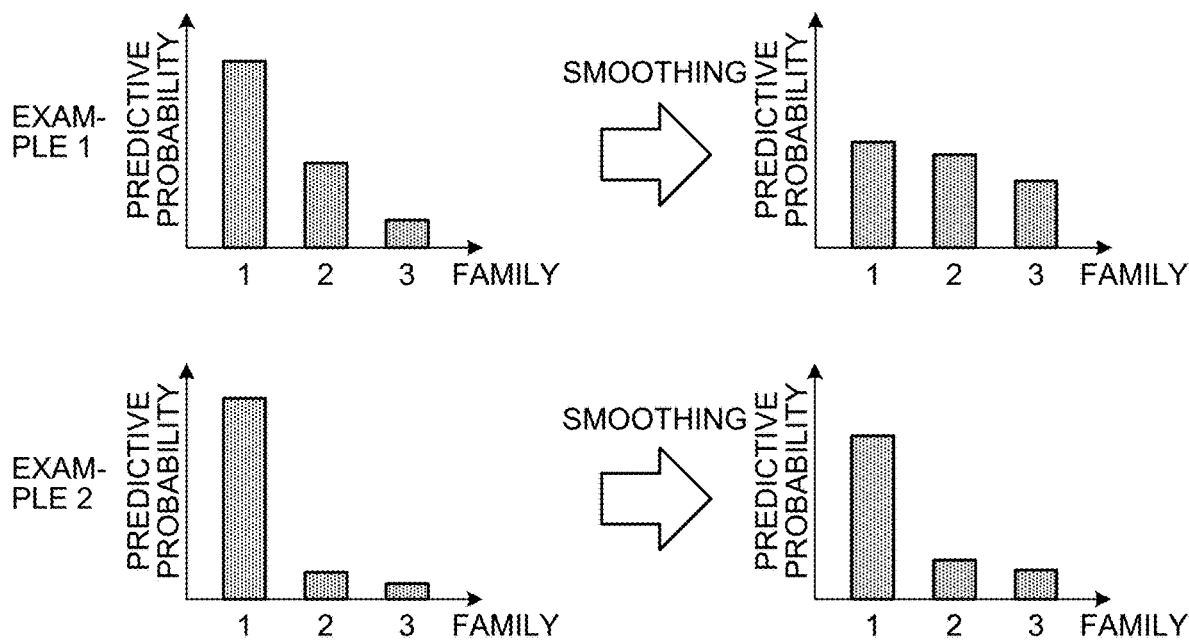
FIG. 13 is a diagram to explain a method to adjust the predictive probability using the coefficient of the softmax function.

(4) Adjusting the predictive probabilities using the coefficient of the softmax function (see FIG. 13).

For example, in use of the method (1) that increases the predictive probabilities of a certain number of families (for example, two) selected in descending order from the family with the highest probability, the feature extraction unit 4 sets the predictive probabilities of the families 1 and 2, which are the highest of the families 1 to 3, at the same value (see Examples 1 and 2 of FIG. 10).

For example, in use of the method (2) that increases the predictive probabilities of families the values of which are greater than a threshold, the feature extraction unit 4 sets the predictive probabilities of the families 1 and 2, of the families 1 to 3 in Example 1 of FIG. 11, that have values greater than the predetermined threshold, at the same value. In Example 2 of FIG. 11, since only the family 1 of the families 1 to 3 has the predictive probability greater than the predetermined threshold, the feature extraction unit 4 extracts features based only on the predictive probability of the family 1.

For example, in use of the method (3) that adds a certain value (constant) to the predictive probabilities (see FIG. 12), the feature extraction unit 4 smooths the predictive probabilities of the families 1 to 3 indicated in the left of Example 1 of FIG. 12 after adding a predetermined value (for example, a constant a) to the predictive probabilities and calculates the predictive probabilities of the families 1 to 3 indicated in the right of Example 1. In Example 2 of FIG. 12, the feature extraction unit 4 smooths the predictive probabilities of the families 1 to 3 indicated in the left of Example 2 of FIG. 12 after adding a predetermined value (for example, a constant a) to the predictive probabilities and calculates the predictive probabilities of the families 1 to 3 indicated in the right of Example 2. Smoothing of the predictive probability of each family is performed by the following example expression (2).

$$p'_i = \frac{p_i + a}{\Sigma_j(p_j + a)} \quad \text{EXPRESSION (2)}$$

In the expression (2), a is a constant, pi is the predictive probability of a family i, pi' is a smoothed predictive probability of the family i, and j is a variable for the family.

For example, in use of the method (4) that adjusts the predictive probability using the coefficient of the softmax function (see FIG. 13), the feature extraction unit 4 smooths the predictive probabilities of the families 1 to 3 indicated in the left of Example 1 of FIG. 13 by adjusting the coefficient of the softmax function and calculates the predictive probabilities of the families 1 to 3 indicated in the right of Example 1. Likewise, the feature extraction unit 4 smooths the predictive probabilities of the families 1 to 3 indicated in the left of Example 2 of FIG. 13 by adjusting the coefficient of the softmax function and calculates the predictive probabilities of the families 1 to 3 indicated in the right of Example 2. Smoothing of the predictive probability of each family is performed using the following example expression (3).

$$p'_i = \frac{\exp(a \times \log(p_i))}{\Sigma_j(\exp(a \times \log(p_j)))} \quad \text{EXPRESSION (3)}$$

In the expression (3), a is a coefficient, pi is the predictive probability of a family i, pi' is a smoothed predictive probability of the family i, and j is a variable for the family.

In the case that the number of similar families is known in advance, the method (1) is preferably used, which increases the predictive probabilities of a predetermined number of families selected in descending order from the family with the highest predictive probability. In the case that the number of similar subclasses is comparatively small, the method (2) is preferably used, which increases the predictive probabilities of families the values of which are greater than a threshold. In the case that the number of similar families is comparatively large, the method (3) is preferably used, which adds a predetermined value (constant) to the predictive probabilities. If the number of similar families and the number of not similar families are close to each other, the method (4) is preferably used, which adjusts the predictive probabilities using the coefficient of the softmax function.

EXAMPLE APPLICATION

The data classification device 1 in the embodiments is used for detecting an attack from an unknown family, as exemplarily described below. For example, a system including the above data classification device 1 performs the following procedures (1) through (5).

Procedure (1) Collecting normal (benign) proxy logs and malicious proxy logs along with the labels of the class and the subclass of each proxy log.

Procedure (2) Calculating a numerical vector from the proxy log.

Procedure (3) Extracting features shared between a plurality of subclasses.

Procedure (4) Constructing a classifier of class using the extracted feature.

Procedure (5) Detecting an attack using the classifier.

The above proxy logs are, for example, stored in a data storage on a network illustrated in FIG. 14.

Each personal computer (PC) on the network in FIG. 14 is connected to the Internet via a router and a proxy. The data storage records logs (proxy logs) of communications via the proxy. Any format is allowed for recording of the proxy logs, and records data necessary for calculating a numerical vector from a proxy log and information necessary for collecting labels of the class and the subclass of the proxy log.

Labels of the proxy logs may be collected at the procedure (1) using a detection name of an intrusion detection system (IDS) or a detection name of anti-virus software or others. For example, the system labels the class of a proxy log, detected to be malicious by an IDS, as malicious, and sets the label of the subclass based on the detection name of the IDS. Data may be labeled by the IDS after stored in the data storage. Detection and labeling by the IDS may be carried out when the proxy log is recorded.

FIG. 15 illustrates an example numerical vector calculated from a proxy log at the procedure (2). In this example, the system calculates a numerical vector from an URL included in a hypertext transfer protocol (HTTP) request of a proxy log. This numerical vector is designed to reflect the characteristics of malicious data and benign data. The numerical vector may be created by quantifying the presence or absence of a subdomain in the URL included in the HTTP request, the length of the URL, the number of levels in the path hierarchy and the number of queries in the URL, and the like, or may be created by quantifying the entropy of the query, specification of the host name using an IP address, the popularity of the domain name, the HTTP method, the content-type, and other components, of the URL in the HTTP request.

FIG. 15 illustrates an example in which a numerical vector is calculated for every HTTP request. Instead of this, a numerical vector may be calculated for a set of HTTP requests. The set may be composed of such HTTP requests having the source IP address and the destination fully qualified domain name (FQDN) identical to each other, or may be of HTTP requests having the source IP address and the destination domain name identical to each other, or may be of HTTP requests sent from the same destination IP address in a predetermined time period.

At the procedure (3), the system extracts features shared between the subclasses using any method described in the above first to third embodiments.

At the procedure (4), the system constructs a classifier for classification into classes using the features extracted by the procedure (3). Other than neural networks, the classifier may be constructed using random forests, SVMs, and other methods.

FIG. 16 illustrates an example configuration of a system that detects an attack at the procedure (5) using the classifier constructed at the procedure (4). In FIG. 16, the known data input unit 3 (see FIG. 1) of the data classification device 1 is not illustrated.

The classifier constructed at the procedure (4) is stored in the data storage of FIG. 16. The classification unit 5 of the data classification device 1 classifies target data as malicious or not malicious using the classifier stored in the data storage. In other words, the classification unit 5 detects an attack. The classification unit 5 then outputs the result of classification to a notification unit. For example, if the target data is classified as malicious, the notification unit notifies the owner of the terminal having sent the target data or a remote monitoring center of receipt of a malicious communication (attack). In this manner, the system can detect an attack from an unknown family and notify of the result.

Computer Program

The functions of the data classification device 1 described in the above embodiments are implemented by installing a necessary computer program to a desired information processor (computer). For example, the information processor functions as the data classification device 1 by executing the above computer program, provided as packaged software or online software. Examples of the information processor include a desktop or a laptop personal computer and a rack-mount server computer. Examples of the information processor may further include mobile communication terminals such as a smartphone, a mobile phone, and a personal handy-phone system (PHS), and personal digital assistants (PDA). The data classification device 1 may be installed to a cloud server.

Figure 17:
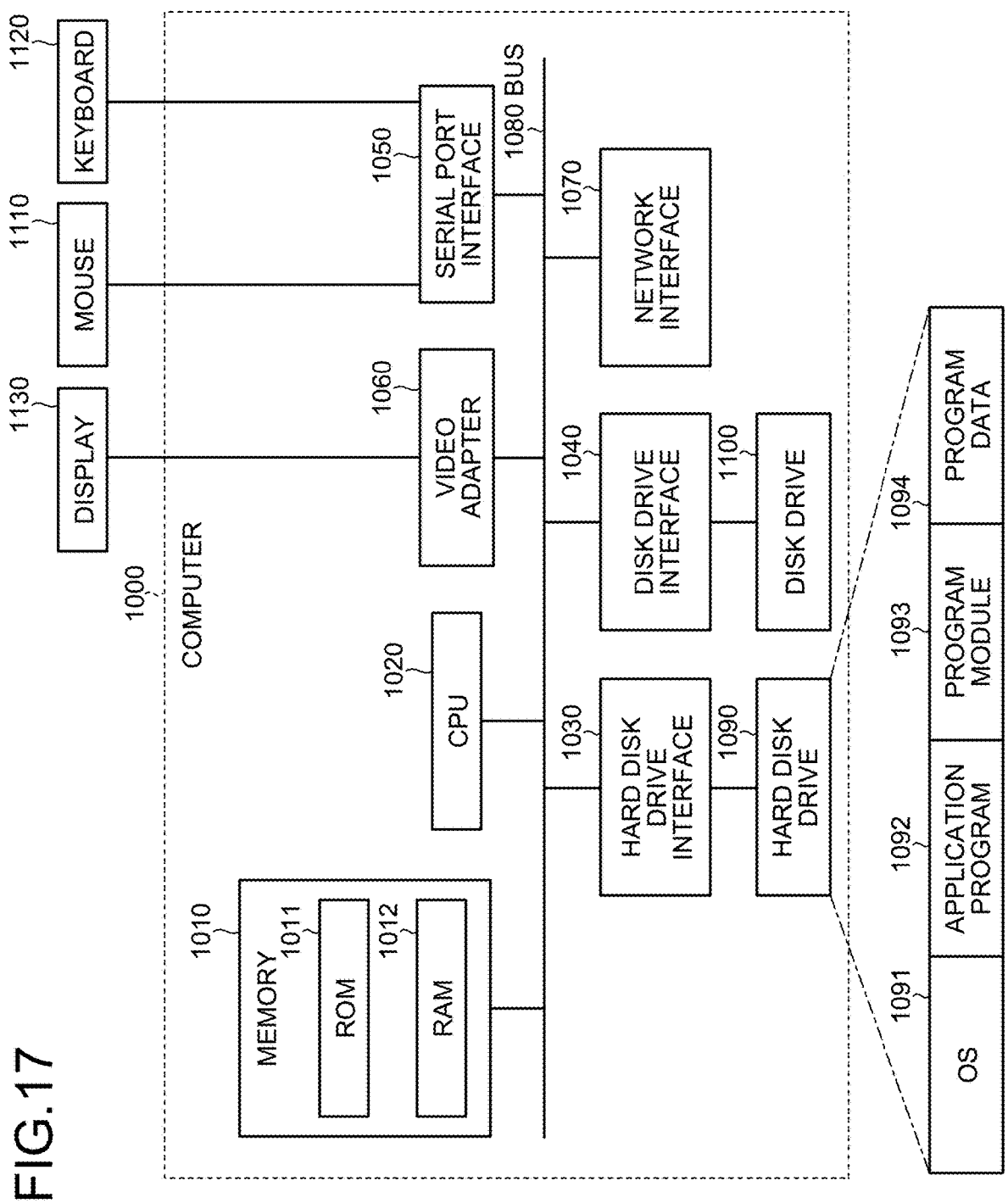
FIG. 17 is a diagram that illustrates an example computer to execute a data classification program.

An example computer to execute the above computer program (data classification program) will now be described with reference to FIG. 17. As illustrated in FIG. 17, a computer 1000 includes, for example, a memory 1010, a CPU 1020, a hard disk drive interface 1030, a disk drive interface 1040, a serial port interface 1050, a video adapter 1060, and a network interface 1070. The devices are connected with one another by a bus 1080.

The memory 1010 includes a read only memory (ROM) 1011 and a random access memory (RAM) 1012. The ROM 1011 stores, for example, a boot program such as Basic Input/Output System (BIOS). The hard disk drive interface 1030 is connected to a hard disk drive 1090. The disk drive interface 1040 is connected to a disk drive 1100. For example, a detachable memory medium, such as a magnetic disk and an optical disc is inserted into the disk drive 1100. The serial port interface 1050 is connected with, for example, a mouse 1110 and a keyboard 1120. The video adapter 1060 is connected with, for example, a display 1130.

As illustrated in FIG. 17, the hard disk drive 1090 stores, for example, an OS 1091, an application program 1092, a program module 1093, and program data 1094. Various kinds of data and information described in the above embodiments are stored, for example, in the hard disk drive 1090 and the memory 1010.

The CPU 1020 loads the program module 1093 and the program data 1094, stored in the hard disk drive 1090, onto the RAM 1012 as necessary, and executes the above procedures.

The program module 1093 and the program data 1094 relating to the above data classification program are stored in the hard disk drive 1090. Without being limited thereto, they may be stored, for example, in a detachable memory medium and loaded onto the CPU 1020 via the disk drive 1100 or a similar device. The program module 1093 and the program data 1094 relating to the above program may be stored in another computer connected via a network, such as a LAN and a wide area network (WAN) and loaded by the CPU 1020 via the network interface 1070.

REFERENCE SIGNS LIST

1 DATA CLASSIFICATION DEVICE
2 TARGET DATA INPUT UNIT
3 KNOWN DATA INPUT UNIT
4 FEATURE EXTRACTION UNIT
5 CLASSIFICATION UNIT

The invention claimed is:

1. A data classification device, comprising:
   a memory; and
   a processor coupled to the memory and programmed to execute a process comprising:
   receiving an input of known data, the known data being data already classified into a class and a subclass subordinate to the class;
   extracting features from the known data, wherein the features which are extracted are features shared between the subclasses in the class;
   determining whether classification of the known data belonging to the class into a subclass existing within the subclasses using a feature of the features which are extracted is a success or failure;
   outputting the feature if it is determined that the feature causes the classification to fail; and
   classifying classification target data into a class indicating malicious or not using the output feature for detecting an attack and notifying a terminal which sent the classification target data of a result of the classifying.

2. The data classification device according to claim 1, wherein the extracting extracts, from features included in the known data, a feature that causes classification of the known data belonging to a same class into subclasses similar to one another using the feature to fail.

3. The data classification device according to claim 1, wherein the extracting extracts, from features included in the known data, a feature that causes classification of the known data of a same class into a subclass using the feature to fail, and that causes classification of the known data into a class using the feature to succeed.

4. The data classification device according to claim 1, wherein the extracting, when known data of a same class is classified into a subclass using a feature, calculates a predictive probability predicting into which subclass the known data is classified, and calculates a value by smoothing the calculated predictive probability between subclasses, and extracts, from features included in the known data, a feature that makes a result of classification of the known data into a subclass using the feature close to a value of the smoothed predictive probability.

5. The data classification device according to claim 1, wherein a data group belonging to the same subclass is a malicious data group belonging to a malicious class and created using a same malicious tool.

6. A data classification method executed by a data classification device, the data classification method comprising:
   receiving an input of known data, the known data being data already classified into a class and a subclass subordinate to the class;
   extracting, features from the known data, wherein the features which are extracted are features shared between the subclasses in the class:
   determining whether classification of the known data belonging to the class into a subclass existing within the subclasses using a feature of the features which are extracted is a success or failure;
   outputting the feature if it is determined that the feature causes the classification to fail; and
   classifying classification target data into a class indicating malicious or not using the output feature for detecting an attack and notifying a terminal which sent the classification target data of a result of the classifying.

7. A non-transitory computer-readable recording medium having stored therein data classification program that causes a computer to execute a process comprising:
- receiving an input of known data, the known data being data already classified into a class and a subclass subordinate to the class;
- extracting features from the known data, wherein the features which are extracted are features shared between the subclasses in the class;
- determining whether classification of the known data belonging to the class into a subclass existing within the subclasses using a feature of the features which are extracted is a success or failure;
- outputting the feature if it is determined that the feature causes the classification to fail; and
- classifying classification target data into a class indicating malicious or not using the output feature for detecting an attack and notifying a terminal which sent the classification target data of a result of the classifying.

* * * * *